United States Patent [19]

Von Tapavicza et al.

[11] Patent Number: 6,122,860
[45] Date of Patent: Sep. 26, 2000

[54] METHOD OF BOOSTING SURFACE CONSOLIDATION OF SOIL THREATENED BY EROSION

[75] Inventors: Stefan Von Tapavicza, Erkrath; Heinz Mueller, Monheim; Claus-Peter Herold, Mettmann; Heinz Boettcher, Erkrath; Frank Burbach, Willich, all of Germany

[73] Assignee: Henkel Kommanditgesellschaft auf Aktien, Duesseldorf, Germany

[21] Appl. No.: 09/091,797

[22] PCT Filed: Dec. 13, 1996

[86] PCT No.: PCT/EP96/05602

§ 371 Date: Dec. 22, 1998

§ 102(e) Date: Dec. 22, 1998

[87] PCT Pub. No.: WO97/23579

PCT Pub. Date: Jul. 3, 1997

[30] Foreign Application Priority Data

Dec. 22, 1995 [DE] Germany ................................ 195 48 314

[51] Int. Cl.$^7$ ............................ C09K 17/20; C09K 17/22
[52] U.S. Cl. ................................................... 47/58.1; 47/9
[58] Field of Search ........................ 47/58.1, 9; 405/263, 405/264

[56] References Cited

U.S. PATENT DOCUMENTS

| | | |
|---|---|---|
| 3,545,130 | 12/1970 | Strother Jr. et al. . |
| 3,640,021 | 2/1972 | Grafmuller .................................. 47/9 |
| 3,643,444 | 2/1972 | Hodgson . |
| 3,797,690 | 3/1974 | Taylor et al. . |
| 3,887,506 | 6/1975 | Hewitt .................................. 260/17 A |
| 4,072,020 | 2/1978 | Bishop .................................. 61/36 C |
| 5,125,770 | 6/1992 | Hessling et al. .................... 405/263 |
| 5,151,123 | 9/1992 | Kviestis ............................ 106/287.17 |
| 5,725,470 | 3/1998 | Lazarowitz et al. ............... 405/128 X |
| 5,782,580 | 6/1998 | Aubet et al. ............................ 405/128 |
| 5,846,601 | 8/1998 | Ritter et al. ....................... 405/264 X |
| 6,048,377 | 4/2000 | Kviesitis ............................ 47/58.1 X |

FOREIGN PATENT DOCUMENTS

| | | |
|---|---|---|
| 148520 | 5/1981 | German Dem. Rep. . |
| 43 24 474 | 1/1995 | Germany . |
| 44 28 269 | 2/1996 | Germany . |
| 54064802 | 11/1997 | Japan . |
| 75 01787 | 3/1975 | South Africa . |
| WO 95/03372 | 2/1995 | WIPO . |

OTHER PUBLICATIONS

Soil Sci. 118(5): 332–8 (1974).
Farbe & Lack 98: 505–8 (1992).

*Primary Examiner*—Michael J. Carone
*Assistant Examiner*—Jeffrey L. Gellner
*Attorney, Agent, or Firm*—John E. Drach; Henry E. Millson, Jr.; Glenn E. J. Murphy

[57] ABSTRACT

The invention relates to a process for intensifying the surface stabilization of soil susceptible to erosion by introduction of water-based adhesion-promoting impregnating compounds based on esters of polyvinyl alcohol with $C_{1-5}$ monocarboxylic acids and mixtures thereof with higher monocarboxylic acids (binders) using surface-active and biogiclly compatible wetting agents. The process is characterized in that impregnation of the soil is carried out in several stages and in that an aqueous preparation containing the wetting agents is used at least in the first impregnating stage. Binder is preferably used in a comparatively small quantity in this pre-impregnation stage.

35 Claims, No Drawings

METHOD OF BOOSTING SURFACE CONSOLIDATION OF SOIL THREATENED BY EROSION

BACKGROUND OF THE INVENTION

The teaching according to the present invention relates to an improvement in and extension of the teaching disclosed in DE-A1 43 24 474 and in earlier German patent application P 44 28 269.9 relating to the surface stabilization of sand and/or soil—hereinafter also referred to as soil. These documents describe modifications of the process known per se for securing at least temporary stabilization by application and introduction of selected aqueous polymer preparations to and into the surface of soil layers susceptible to erosion. The water present in the impregnating agent introduced dries in a comparatively short time and the polymer phase left behind stabilizes the granular and/or clay-like structure of the impregnated soil without unduly affecting the permeability of these layers to water. The surface stabilization in question is not confined to soil in the narrower sense. The corresponding stabilization of other surface regions which have to be protected against wind erosion, for example, is also encompassed by the teaching according to the invention. Examples of such surface regions include rubbish dumps and/or waste tips with or without a covering of topsoil or other protective layers. However, grass-covered areas for example, which are exposed to fairly severe mechanical and/or climatic influences, are also susceptible to erosion. Examples of corresponding grass-covered areas are to be found in leisure facilities, such as golf courses with their well-trodden fairways and tees, fields for ball games, such as football, handball and the like. Grassed surfaces such as these are often susceptible to the well-known "dry spots" which are more vulnerable to the effects of weathering. Similar problems are also caused, for example, by wet, heavily compacted soil or by the formation of so-called "thatch" which prevents water applied from reaching the root layer and, hence, leads to the formation of undernourished dry areas which in turn become the starting point for erosion.

Development and practice have been concerned for decades with the concept on which the present invention is also based of applying synthetic polymers capable of bonding particulate solids to one another to the surfaces to be stabilized in the form of aqueous dispersions or emulsions and drying them on those surfaces in such a way that the stabilized soil is guaranteed adequate permeability to water. Particular practical significance is attributed in this regard to aqueous polyvinyl acetate dispersions (also referred to hereinafter as PVAc dispersions), cf. for example A. Kullmann et al. in Arch. Acker-Pflanzenbau Bodenkd., 22(11), 713–19. In addition to polyvinyl acetate, the following are described as useful binders: butadiene/styrene latex, a urea/formaldehyde polymer and a bitumen emulsion. The corresponding stabilization of dune sand against the effects of rain is the subject of an article by D. Gabriels et al. (Univ. Ghent, Belgium) in Soil Sci., 118(5), 332–8. This publication also mentions a binder system based on polyvinyl acetate among the preferred binders. So far as the other works carried out worldwide are concerned, reference is made purely by way of example to certain patents, cf. U.S. Pat. Nos. 4,072,020, 3,887,506, HU 11 654 and ZA 7501787.

The list of requirements and problems involved in soil stabilization is extremely diverse. Without any claim to completeness, many of the properties required in practice are listed in the following: the material should be resistant at least to pedestrian traffic; it should not be affected by the particular temperatures prevailing, by atmospheric moisture or by rain (for the particular period of time envisaged); it should also be resistant to high wind speeds. The material to be applied should be non-inflammable and should not represent a fire risk or exposure risk during storage and also during and after use. Its transport and application should not require any particular safety measures or the wearing of protective clothing. The cured polymeric impregnation should not have any toxic effects on germinating plants, on growing plants or on animals and should be colorless and transparent. Taking these and other requirements into consideration, the knowledge acquired hitherto may be summarized as follows:

1. PVAc homopolymer dispersions are basically suitable as binders. In the absence of plasticizers, however, they lead to such brittle cohesion of the impregnated layers of soil that crucial performance requirements are not satisfied.
2. The deficiency mentioned in (1) can be overcome by adding plasticizers which are liquid under normal conditions. In practice, dibutyl phthalate in particular has established itself as a plasticizer. Although correspondingly plasticized PVAc homopolymers lead to firm cohesion, dibutyl phthalate is not degradable. By contrast, DE 43 24 474 discloses degradable plasticizers.
3. Although internally plasticized polymer dispersions (polyvinyl acetate-co-dibutyl maleate) provide for firm cohesion, they are also non-degradable.

The teaching of DE-A1 43 24 474 cited at the beginning addresses the problem of providing PVAc homopolymer dispersions for the described application with plasticizers which, on the one hand, satisfy the various technical requirements but which, on the other hand, are biocompatible and, in particular, can be degraded. The teaching of this document is based on the knowledge that, basically, PVAc homopolymers are biocompatible and degradable even though the degradation of this polymer is comparatively slow. The relevant literature is represented, for example, by H. Kastien et al. "Der quantitative mikrobiologische Abbau von Lackkunstharzen und Polymerdispersionen", farbe+lack, Vol. 98, 7/1992, 505–8. According to the teaching of the cited document, the following selected classes of compounds are used as biologically acceptable plasticizers for PVAc dispersions: triesters of glycerol with lower aliphatic monocarboxylic acids, citric acid triesters with lower aliphatic monohydric alcohols and/or epoxidized triglycerides of at least partly olefinically unsaturated fatty acids.

Earlier German patent application P 44 28 269.9 likewise cited at the beginning relates to an improvement in the teaching of the document mentioned in the preceding paragraph. This improvement takes into account the fact that the soil surfaces stabilized with esters based on polyvinyl alcohol can soften up considerably where the substratum or underlying soil is wet or in the event of intensive contact with moisture, for example in the form of heavy rain. Although the stabilization generally returns after drying, i.e. does not completely disappear, there is nevertheless a weakness here so far as practical application is concerned. Accordingly, the earlier application cited relates to the use of fatty acids or fatty alcohols which are solid at room temperature and/or which cure on contact with air and/or at least substantially water-insoluble esters, ethers and/or salts thereof as degradable and biologically compatible stabilizers for increasing the resistance to water of soil impregnations based on polyvinyl acetate and comparable esters of polyvinyl alcohol with lower monocarboxylic acids. The disclosure of this earlier application is hereby included as part of the disclosure of the present invention, the key parameters which are now also to be used in the context of the new technical teaching being discussed in detail in the following.

The teaching according to the invention seeks to achieve a further improvement in the surface impregnation and stabilization of soil layers susceptible to erosion. A particular objective in this regard is to make it possible to influence the rate and, optionally, depth of penetration of the aqueous preparations containing the polymeric binders into the surface of the soil to be stabilized. In particular, the teaching according to the invention seeks to achieve sufficiently rapid and sufficiently deep penetration of the surface-stabilizing binder into the soil, even in problem areas, for example hillsides, heavily compacted soils or grassed areas affected by thatch and comparable inhibiting layers. At the same time, the teaching according to the invention seeks to achieve improved stabilizing effects—possibly even with less binder.

The teaching according to the invention is based on a concept which is already discussed in earlier German patent application P 44 28 269.9, namely the possibility of using small quantities of selected components resembling wetting agents in character in the aqueous preparations of the binder (impregnating agent) and/or the stabilizers. Surface-active components of the o/w type are described as being particularly suitable; in the preferred embodiment, they are also distinguished by their biological compatibility and, in particular, by their biological degradability. The class of surfactants based on alkyl polyglycosides (APG) is mentioned as one important example in this regard.

The technical teaching of the new development described in the following is based on the observation that the specifically controlled use of these and other surface-active wetting agents can optimize the required soil stabilization in many respects.

SUMMARY OF THE INVENTION

Accordingly, the crux of the teaching according to the invention is a process for intensifying the surface stabilization of soil susceptible to erosion by introduction of water-based adhesion-promoting impregnating compounds based on esters of polyvinyl alcohol with $C_{1-5}$ monocarboxylic acids and mixtures thereof with higher monocarboxylic acids—hereinafter also referred to in the interests of simplicity as "binders"—if desired using components curing on contact with air to increase the water resistance of the impregnating compound—hereinafter also referred to in the interests of simplicity as "stabilizer".

The process according to the invention is characterized in that impregnation of the soil is carried out in several stages and in that an aqueous preparation containing biologically compatible wetting agents to accelerate and/or intensify wetting of the soil with aqueous phase is used at least in the first impregnating stage.

In the most important embodiment of the teaching according to the invention, an aqueous treatment solution which, together with the wetting agents, contains some of the total binder and/or stabilizer to be applied to the soil is used in this first stage for impregnating the soil to be stabilized. In preferred embodiments, however, the percentage of binder introduced in this first impregnating stage is comparatively limited and amounts to less than 50% by weight and, more particularly, to less than 20% by weight of the total quantity of binder to be applied to the soil surface. In another very important embodiment of the invention, however, an aqueous solution of the wetting agents with no binder and/or stabilizer is used in a first stage so that the soil to be treated is intensively premoistened.

DETAILED DESCRIPTION OF THE INVENTION

The starting point of the modification described hereinafter to the stabilization of soil in accordance with applicants' previously cited patents is the observation that, ultimately, the specifically controlled use of the auxiliaries based on wetting agents significantly promotes the penetration of the aqueous binder preparation into the soil to be stabilized. The same applies to the incorporation of any preparations of the stabilizers used at the same time. Specifically, the following circumstances prevail:

Wetting agents of the described type are particularly effective in intensifying the introduction of moisture and goodness into the soil particularly when they are used in a first stage—as it were to impregnate the soil to be stabilized. For no obvious reason, this effect is particularly pronounced if, in this first treatment stage, the wetting agents are used in an aqueous preparation which, in addition, may also contain limited quantities of the binder and/or stabilizer to be subsequently used for soil stabilization. By introducing the wetting agents in this way, more particularly together with limited quantities of the total amount of binder to be introduced, the useful-material components used together in the first process stage would appear to be synergistically influenced; the same also applies to the subsequent introduction of the rest of the binder. Studies conducted by applicants have shown that it is possible in this way not only to achieve more rapid and, optionally, deeper impregnation of the soil surface in this way, considerable quantities of binder can also saved with no deterioration in the quality of soil stabilization achieved.

Particularly interesting effects can be obtained in particular when highly dilute aqueous binder preparations additionally containing the wetting agents are used in this first pre-impregnation stage. Thus, in one preferred embodiment of the invention, this first stage is carried out with aqueous impregnating solutions of which the binder content is below 5% by weight and, for example, amounts to at most 2 to 3% by weight. Particularly pronounced effects can be obtained using aqueous preparations with a binder content of at least about 0.1 to 0.3% by weight and up to at most about 2% by weight. In general, binder contents of the aqueous treatment solution of around 0.5 to 1.5% by weight have proved to be particularly effective for this preparatory stage.

Even in very small quantities, the wetting agents introduced before-hand or at the same time in this treatment stage can develop substantial effects, as known in principle in connection with the practice of using wetting agents. In particular, quantities of wetting agent of up to about one order of magnitude below the binder content of the aqueous treatment liquid used in this first stage have proved to be particularly useful. Thus, aqueous liquid phases in which the content of biologically compatible wetting agents or wetting aids is at most about 1% by weight and preferably at most about 0.5% by weight have proved to be suitable for use in the first impregnating stage. In general, wetting aids are used in quantities of at most about 0.1 to 0.2% by weight, based on the aqueous phase of the first impregnating stage. Depending on the intensity of the wetting effect, even distinctly smaller quantities, i.e. for example wetting agent contents of 0.005 to 0.1% by weight, based on the aqueous phase, can also have useful effects.

Suitable wetting agents or wetting aids may be selected from a wide range of components known for this purpose. It is known that surface-active auxiliaries of this type are characterized by a combination of hydrophilic and oleophilic molecule constituents, the corresponding wetting-active components for the particular application being characterized by their HLB values (hydrophilic/lipophilic balance). Suitable wetting agents for wetting solid surfaces with aqueous phase fall in particular into the range of corresponding auxiliaries for the preparation of o/w emulsions and hence into HLB ranges of at least about 7 or 8 to about 18. Corresponding wetting aids with HLB values in the range from about 10 to 18 and, more particularly, from about 12 to 18 can be particularly suitable.

Preferred wetting aids for use in the process according to the invention are distinguished by high ecological compatibility and, in particular, by biological degradability. The relevant technology knows above all of wetting aids of this type which are based at least partly on natural materials and which are associated, for example, with the range of corresponding esters, partial esters and derivatives thereof, more particularly the corresponding polyethoxylates and oligoethoxylates. Acetals, for example the known alkyl (poly) glycoside compounds which are also known among experts as "APG compounds", are other important representatives. Basically, reference may be made to the now widely developed knowledge of experts on such ecologically compatible and, in particular, naturally degradable auxiliaries with a wetting or surfactant effect. Some of the most important classes of compounds are mentioned here purely by way of example: suitable esters based on natural substances and modified wetting agents derived therefrom are, for example, sorbitan esters and sorbitan ester ethoxylates; oligoglycerol partial esters, such as diglycerol or triglycerol partial esters, are also valuable auxiliaries as are surface-active castor oil ethoxylates, for example corresponding compounds containing 20, 30 or 40 EO groups in the molecule. Important representatives for the teaching according to the invention can also be found in particular among the emulsifiers used in foods, for example sugar esters, esters of lactic acid and/or tartaric acid.

Basically, particular significance may be attributed in this regard to nonionic wetting agents which combine oleophilic constituents with hydrophilic constituents in their molecule and form wetting agents of the o/w type. Besides the compounds mentioned above, particularly suitable representatives of the classes of wetting agents in question here are the APG compounds already mentioned and fatty alcohol (poly)alkoxylates. Mixtures of a number of suitable representatives of the surfactant classes in question, i.e. in particular mixtures of APG and fatty alcohol (poly)alkoxylate compounds, are also particularly suitable for use in accordance with the invention. Suitable representatives of fatty alcohol (poly)alkoxylate compounds are, in particular, fatty alcohol ethoxylates derived from fatty alcohols containing 10 to 20 carbon atoms and, more particularly 12 to 18 carbon atoms in the molecule on the one hand and at least 10 and preferably at least 20 EO units in the wetting agent molecule. Particularly interesting representatives are, for example, $C_{12-18}$ fatty alcohol ethoxylates containing 30 or 40 EO units in the molecule. Particularly suitable wetting agents are the already repeatedly mentioned alkyl (poly) glycoside compounds (APG) which are obtained by reacting monohydric alcohols containing in particular 6 to 20 and preferably 8 to 18 carbon atoms with (poly)glycosides, more particularly starch or glucose, and/or oligoglycosides. $C_{8/10}$ APG compounds with an average degree of polymerization (DP) of $\leq 5$ and, more particularly, from 1 to 2 can be particularly suitable wetting agents for the purposes of the invention.

The process according to the invention is thus carried out, for example, as follows: the soil to be stabilized is watered in a first stage with an aqueous preparation of wetting agent and, if desired, binder (binder content for example about 1% by weight and wetting agent content up to about 0.1% by weight). The particular quantity of liquid to be used is determined by a number of parameters, above all the characteristics of the soil and its ability to absorb the aqueous phase. On the other hand, the required depth of impregnation also has to be taken into account. The main quantity of binder and, if desired, also stabilizer is then introduced into the soil thus pretreated in at least one other stage. This second soil-impregnating stage is preferably carried out so soon after the pre-impregnation stage that the main quantity of binder is introduced into the soil still moist or wet from the pretreatment.

In another preferred embodiment of the invention, which follows the teaching of DE 43 24 474, the binders based on the described polyvinyl alcohol esters are used together with plasticizers which are preferably biologically degradable and which in particular belong at least partly to the following groups: triesters of glycerol with lower aliphatic monocarboxylic acids, citric acid triesters with lower aliphatic monohydric alcohols and/or epoxidized triglycerides of at least partly olefinically unsaturated fatty acids. In accordance with the teaching of the cited document, these plasticizers are added to the aqueous dispersions of the particular polyvinyl alcohol esters selected and, more particularly, to the corresponding aqueous polyvinyl acetate dispersions in quantities of about 1 to 15% by weight and preferably in quantities of about 3 to 10% by weight, based on an approximately 50% by weight aqueous polyvinyl acetate dispersion. Plasticizers may also be used in the first treatment stage of the process according to the invention together with the small polymer component used in that stage. Further directions as to procedure, more particularly in regard to the characteristics of the polymer compound(s) used as binders, can be found in the cited document. Thus, aqueous polyvinyl acetate dispersions stabilized in particular with biodegradable protective colloids are suitable. Suitable protective colloids are, in particular, polyvinyl alcohol and/or starch and/or water-soluble starch derivatives. However, the quantities in which they are used are preferably limited to such an extent that the polyvinyl acetate coating on the soil remains sufficiently resistant to the effects of weathering. The biodegradable protective colloids are best used, for example, in quantities of up to about 5% by weight and preferably in quantities of about 0.5 to 3% by weight, based on polyvinyl acetate solids.

Particularly important plasticizers are glycerol triesters of aliphatic monocarboxylic acids containing 2 to 6 and, more particularly, 2 to 4 carbon atoms in the molecule, particular significance being attributed to triacetin. Other suitable plasticizers are citric acid triesters with aliphatic monohydric alcohols containing 2 to 6 carbon atoms and preferably 2 to 4 carbon atoms. Corresponding citric acid esters in which the citric acid contains a free hydroxyl group are particularly suitable, as are derivatives derivatized at this point of the molecule, more particularly corresponding citric acid esters containing acyl groups. Suitable acyl groups are, for example, residues of, in particular, saturated carboxylic acids containing 2 to 10 carbon atoms and residues of corresponding acids containing an even larger number of carbon atoms. Other particularly suitable plasticizers can be found among the classes of epoxidized oils of natural origin, more particularly epoxidized rapeseed oil and/or epoxidized soybean oil. Information on the use of stabilizers in the binder or binder mixture can be found in earlier application DE 44 28 269. For the purposes of the disclosure of the present invention, the following only brief summary is presented here:

The additional components suitable as stabilizers are preferably biologically compatible and naturally degradable auxiliaries which, by virtue of the at least predominant oleophilic structure of their molecule, are capable of significantly increasing the water resistance of the impregnating compound (binder), even under extreme conditions. Nevertheless, these auxiliaries are accessible to preferably natural degradation processes. The structure of their molecule is distinguished not only by its predominant oleophilic character, but also by the presence of functional groups (hydroxyl groups, carboxyl groups, ether and/or ester groups), which are known as starting points for the simplified microbiological degradation of such substances or classes of substances.

Fatty acids and fatty alcohols which contain hydrocarbon chains in the molecule with at least 6 and preferably with at least 8 to 10 carbon atoms are particularly suitable. The upper limit to the number of carbon atoms in the molecule is generally, but not necessarily, at about 30 carbon atoms. Fatty acids of natural and/or synthetic origin and the corresponding fatty alcohols are generally mixtures of substances which contain on average 10 to 24 carbon atoms and, more particularly, around 12 to 22 carbon atoms in the molecule, cf. the relevant specialist literature.

Organic fatty compounds of the type in question may be aliphatically saturated and monoolefinically and/or polyolefinically unsaturated. Many representatives of natural origin are distinguished in particular by the presence of more or less large quantities of such monoolefinically and/or polyolefinically unsaturated carboxylic acids with carbon chain lengths in the above-mentioned range.

An important characteristic can be the chain structure of the particular molecule. Fatty acids based on natural substances and fatty alcohols derived therefrom are characterized at least by far predominantly by their linear molecule structure. Synthetic chemistry in particular knows of corresponding representatives with more or less highly pronounced branching of the chain. Finally, it is known that both rheology and biological degradation behavior are dependent upon the structure parameters of the components of fatty character. So far as rheology is concerned, both olefinic double bonds in the molecule and branching of the chain lead to a reduction in the melting points. Biological degradability is best guaranteed in the linear representatives of the fatty components in question, corresponding representatives with an even number of carbon atoms, as present in the components based on natural substances, being particularly readily degradable. However, limited chain branchings by methyl substituents, more particularly isolated methyl substituents, can also be effectively degraded by biological degradation processes.

The degradation processes aimed at and actually occurring within the context of the process according to the invention are, in particular, corresponding aerobic mechanisms. It is established knowledge among experts that not only fatty acids, fatty alcohols and corresponding components containing ester groups are subject to bacteriological attack under these conditions, corresponding ethers are also degraded under aerobic conditions, albeit generally with some delay.

These circumstances known per se to experts have been deliberately discussed in the description of the present invention. So far as the teaching according to the invention is concerned, it is thus possible on the basis of general specialist knowledge to influence the time which the stabilizers used in accordance with the invention require for bacteriological degradation by selecting certain molecule structures of these stabilizers. It is thus indirectly possible to regulate the period of time for which the moisture-repellent hydrophobic properties of the stabilizer are sufficiently pronounced to provide the impregnating compound with the required protection in the soil.

Basically, any representatives of the class of stabilizers in question based on fatty alcohols, fatty acids, their esters and/or ethers and also fatty acid salts are suitable. The particular choice of specific representatives and their form of application are determined by the conditions prevailing and by the requirements to be satisfied in each particular case. Expert knowledge enables individually selected representatives of the classes of stabilizer under discussion to be put to the use according to the invention on the broadest scale.

Basically, these stabilizers are also preferably used and introduced into the soil in the form of an aqueous preparation. Since the stabilizers as such are largely insoluble in water, their use in the form of aqueous emulsions and/or dispersions is the appropriate technical solution. As described in detail hereinafter, the stabilizers may be used both in admixture with and/or separately from the impregnating agents based on polyvinyl acetate. The structure-dependent rheology of the classes of oleochemical compounds in question, the application conditions for practical use and the requirements which the stabilizers have to satisfy for use in soil stabilization in accordance with the teaching of the invention enable the particular individual representatives of the compounds used in accordance with the invention to be assigned to a number of sub-groups. Without any claim to completeness, the following observations may be made in this regard:

It is generally desirable that the stabilizers applied in the form of an aqueous emulsion or dispersion should have a minimum film-forming temperature of about 5 to 15° C. and, more particularly, about 5 to 10° C. As the aqueous phase disappears either by sinking into the substratum or by evaporating, sufficiently compact layers of the stabilizers are formed under normal working conditions either within and/or on the surface of the impregnation so that the required protective effect against excessive moisture can be developed.

Suitable stabilizers may be present as solids or as liquid phases at this film-forming temperature. Where the stabilizers used are solid at the film-forming temperature, it can be of advantage to employ flow aids, more particularly organic flow aids, which are preferably miscible with the stabilizers and biologically compatible and degradable. Suitable flow aids of this type are, for example, components based on alcohols, ethers and/or carboxylic acid esters which are liquid and preferably of low volatility at temperatures of 5 to 15° C.

However, another important embodiment is characterized by the use of at least partly monoolefinically and/or polyolefinically unsaturated fatty acids, fatty alcohols and/or derivatives thereof with an ester and/or ether structure as stabilizers. Even in the case of linear fatty components of the type in question, the presence of the olefinic double bonds and the numbers in which they are present generally ensure that the stabilizers are sufficiently liquid at the temperature at which they are applied to the soil to be treated, thus guaranteeing the formation of compact hydrophobic layers and hence the development of the required stabilizing effect against water. Olefinically unsaturated stabilizers of the type in question afford the following additional advantage: it is known that corresponding liquid fatty compounds dry under the effect of atmospheric oxygen so that the originally liquid films are converted into solid films. Nevertheless, the biological degradability requirement remains intact, cf. the above-cited literature reference Heinz Kastien et al. in "Farbe und Lack" 1992.

A particular feature for the formation of at least substantially compact films of oleochemical character lies in the following embodiment: both saturated and monoolefinically and/or polyolefinically unsaturated fatty acids can be converted by the effect of, in particular, polyvalent cations into the corresponding salts which are generally distinguished by modified rheological properties. Suitable and preferred polyvalent salt-forming cations are, in particular, corresponding representatives of the second and/or third main group of the periodic system, more especially calcium and/or aluminium. However, salt formation may also take place after the stabilizers have been applied to the soil. Corresponding salts containing olefinically unsaturated components in the carboxylic acid residues can also be subsequently reacted off by oxidation, thus providing for further stabilization.

According to the invention, stabilizers of ester structure can be of particular importance. In a first class of substances, the defined fatty acid residues determine the ester structure. For example, full and/or partial esters of, in particular, at least partly olefinically unsaturated fatty acids with polyhydric alcohols may be used. Preferred esters are derived from lower polyhydric alcohols containing in particular 2 to 6 hydroxyl groups and, preferably, up to 6 carbon atoms. Corresponding glycerides or partial glycerides of the fatty acids and/or their oligomers can be particularly interesting representatives for the purposes of the process according to the invention.

Oils and/or fats based on natural substances are mentioned purely by way of example in this regard. It is known that corresponding oils and/or fats accumulate as triglycerides of fatty acids or fatty acid mixtures with at least partly olefinically unsaturated fatty acid components in the triglyceride. Depending on the structure and concentration of the unsaturated fatty acid residues, these oils and/or fats are suitable for oxidative curing by three-dimensional crosslinking. It is known that use is made of this on a wide scale in practice, for example in the field of lacquer raw materials where linseed-oil-based oxidatively curing oils of natural origin, for example, have been widely used for some time. Corresponding stabilizers of natural origin can be important components for the purposes of the invention. The stabilizers may be used with or without hardening components which generally accelerate the formation of a three-dimensionally crosslinked lacquer film. Relevant specialist knowledge may be applied in this regard.

Another preferred class of ester-based stabilizers may be defined as oligoesters or polyesters of fatty acids and/or fatty alcohols and polyfunctional reactants from the classes of oligo- or polycarboxylic acids and/or oligo- or polyalcohols. Examples of such stabilizers are the known polyesters of the alkyd resin type and also polyvinyl alcohol oligomers and polymers esterified with fatty acid residues and (meth) acrylate oligomers and/or polymers esterified with optionally olefinically unsaturated fatty alcohol residues. An important criterion in the choice of these stabilizers can again be the question of the sufficiently complete degradability—by natural degradation processes in the soil—not only of individual components of the ester or polyester structure, the choice for the application according to the invention can also be determined in particular by the degradability of the fragments of the basic molecule initially formed, for example in the course of an ester hydrolysis.

Among the alkyd resins mentioned above as a suitable class of stabilizers, preference is attributed to selected compounds of this type which are at least largely based on natural substances. It is known that alkyd resins include polyesters of polycarboxylic acids, polyols and monofunctional alcohols and/or carboxylic acids. Alkyd resins reacting by oxidation are well-known commercial products and are covered by general specialist knowledge. They may be used, for example, as starting materials for air-drying lacquers. Known commercial products are also available in particular in the form of aqueous dispersions which contain the self-drying alkyd resins as a fine-particle resin dispersed in a continuous aqueous liquid phase. Air-reactive aqueous alkyd resin dispersions of this type are particularly suitable starting materials for the purposes of the invention.

The oxidative reactivity of such alkyd resin derivatives is generally attributable to the presence of olefinically unsaturated substituents at the alkyd resin polyester molecule. These olefinically unsaturated reactive elements may be introduced into the alkyd resin molecule in known manner by the incorporation of unsaturated alcohols and/or unsaturated carboxylic acids. Representatives of the alkyd resin types under discussion which are at least largely based on natural raw materials are of particular interest in this regard in conjunction with the teaching according to the invention. Thus, monocarboxylic acids and/or monohydric alcohols of natural origin may be used for derivatizing the alkyd resins. Where dicarboxylic acids and at least trihydric alcohols are used in combination with monobasic carboxylic acids and, optionally, other diols, it is possible for example to obtain corresponding monocarboxylic-acid-derivatized alkyd resins which can be made to react or crosslink by oxidation by using at least partly monoolefinically and/or polyolefinically unsaturated monocarboxylic acids. An oxidatively reactive alkyd resin modified with olefinically unsaturated alcohols can also be prepared in known manner by reversing the functionalities.

Particularly preferred alkyd resins according to the invention based on natural substances start out from glycerol as the trifunctional polyol component and fatty acids of natural origin as the monobasic carboxylic acid component. The monofunctional reactants are used on average in approximately such quantities as to allow the required reaction with dicarboxylic acids which, in a preferred embodiment, are in turn degradable by natural degradation processes. Modified alkyd resins of this type based at least predominantly on natural substances are distinguished, for example, by the fact that more than 50% by weight and preferably between 60 and 70% by weight of the alkyd resin consists of components based on natural substances, more particularly glycerol and monofunctional fatty acids, whereas—for the rest—dicarboxylic acids and optionally additional diol components are present in the polymer molecule.

The teaching according to the present invention of introducing the aqueous wetting agent preparation with comparatively small quantities of the binder into the soil to be stabilized in a first process stage is also applicable to the variant where stabilizers are used. Accordingly, these stabilizers may be introduced after the pretreatment according to the invention and after the main impregnation of the soil surface with binder in a following, separate process stage, although it is also possible in accordance with the teaching of DE 44 28 269 to combine introduction of most of the binder with introduction of the stabilizers into a single process stage. To this end, the aqueous preparations of the binder and stabilizers are generally first mixed with one another and then applied together to the soil pretreated in accordance with the invention.

The particular quantities in which the binders based on esters of polyvinyl alcohol on the one hand and, if desired, stabilizers on the other hand are used are determined by a number of factors. In general, minimum quantities of the respective component(s) of at least about 50 g/m$^2$ of soil to be treated and preferably quantities of at least about 100 g/m$^2$ are desirable. These lower limits apply to the useful materials or mixtures of useful materials free from water and, optionally, any flow aids used. Quantities of the binders and, optionally, the stabilizers of up to 400 g/m$^2$ of soil to be treated may be desirable in special cases. In general, satisfactory results are obtained with quantities of about 150 to 250 g/m$^2$ of soil to be treated. The following additional circumstances, which have already been briefly discussed, are of relevance in this regard:

The preconditioning of the soil to be stabilized with the aqueous preparation containing wetting agent and very small quantities of binder in accordance with the invention enables favorable strength levels to be established in the soil while saving considerably on binder. Thus, soil can be satisfactorily stabilized in accordance with the invention even when the quantity of binder and, if desired, the quantity of stabilizer is reduced for example to between 50 and 70% by weight of that quantity which has to be introduced into the soil for adequate stabilization without the pretreatment according to the invention. Understandably, definite figures for the quantities of binders and/or stabilizers required are controlled to a very large extent by the particular soil characteristics encountered. In addition, the soil surface can be impregnated far more easily and, optionally, even to greater depths in accordance with the invention than would be possible without the pretreatment according to the invention with the mixture of surface-active useful materials. It will readily be appreciated that valuable additional advantages can be achieved in this way in a number of applications, for example in the stabilization of hillsides vulnerable to landslides.

The quantity ratios of binder or impregnating agent on the one hand and stabilizer on the other hand (again based on the mixtures of—in particular—water-free, pure useful materials) may be varied within wide limits. For example, quantity ratios of the binder, more particularly based on PVAc, to the stabilizers (water-free useful materials) of about 5:1 to 1:5 and preferably 1:3 to 2:1 are suitable. For many applications, it has proved to be useful to employ substantially equal quantities of binder and stabilizer.

In addition, the depth to which the soil is impregnated can be influenced to a certain extent by sufficiently diluting the useful-material content of the aqueous preparations applied. Aqueous preparations containing less than 50% by weight and preferably less than 30% by weight of polymer are preferred for the stage in which most of the binder is introduced, aqueous preparations in which the lower limit to the polymeric binder content is around 3 to 5% by weight being particularly suitable. Particularly suitable contents of the polymer phase in the aqueous liquid phases for introducing the main quantity of binder are in the range from 5 to 20% by weight and, more particularly, in the range from 5 to 10% by weight. Corresponding figures apply to the case where stabilizers of the described type are use and introduced.

Polyvinyl acetate is particularly suitable as the polymeric binder of the impregnating compound. However, the teaching according to the invention is by no means confined to this particular binder. Other polymers of vinyl alcohol with lower monocarboxylic acids, more particularly containing up to 4 or 5 carbon atoms in the carboxylic acid component, are also suitable. Besides polyvinyl acetate, particular significance is attributed to polyvinyl propionate or rather aqueous preparations thereof. Both homopolymers and copolymers of the polyvinyl esters mentioned may be used in practice.

In another modification of the teaching according to the invention, an important constituent of the impregnating compound can be derived from the group of vinyl ester copolymers. Copolymers of lower vinyl esters of the vinyl acetate and/or propionate type with vinyl esters of higher monobasic carboxylic acids are particularly suitable. Within this group of copolymers, preferred representatives are the vinyl esters of, in particular, saturated monocarboxylic acids containing at least 8 and preferably at least 10 carbon atoms, particular significance again being attributed to the range of 10 to 16 carbon atoms in the monocarboxylic acid component. An important representative of such a copolymer for a number of reasons is, for example, a polyvinyl acetate co-laurate.

The need to add a plasticizer can be eliminated by using the above-mentioned vinyl ester copolymers which contain lower vinyl esters of the vinyl acetate and/or propionate type together with vinyl esters of higher monobasic carboxylic acids, more particularly in the fatty acid range, in the molecule. Further studies conducted by applicants have shown that impregnating agents based on these vinyl ester copolymers meet the two requirements of sufficiently non-brittle impregnation and biological degradability even without the addition of plasticizers. Accordingly, there is no need to use the plasticizers known from the prior art and described in applicants' DE 43 24 474 cited at the beginning.

The technical elements which have been developed in the relevant prior art to form corresponding surface films may also be used for the purposes of the teaching according to the invention. Reference is made here, for example, to the use of growth-promoting agents, more particularly fertilizer-like auxiliaries, and/or to the use of preferably fine-particle solids, more especially in the aqueous preparation of the impregnating compound. In the last-mentioned case, it is known from the prior art to use fine-particle solids based on natural materials, such as sawdust, straw particles, cereal husks, coconuts and/or flax fibers and the like in order in this way to facilitate the formation of local openings for further promoting plant growth without endangering the overall cohesion of the stabilized soil.

It may be desirable to use small quantities of surface-active components, more especially in the aqueous preparations of the impregnating compound and/or the stabilizers. Particularly suitable surface-active components are those of the o/w type which, in the preferred embodiment, are also distinguished by biological compatibility and, in particular, biological degradability. Basically, the wetting aids with preferred HLB values of 8 to 18 and preferably 10 to 18 mentioned above in connection with the prewetting of the soil to be impregnated are suitable surface-active components. Particular significance is attributed in this regard to corresponding surfactants based on alkyl polyglycosides (APG). By using such components, it is possible on the one hand to facilitate stabilization, more particularly the stabilization of stabilizer components in aqueous preparations (for example the stabilization of linseed oil as an aqueous dispersion) and on the other hand additionally to promote wetting of the soil to be stabilized. Particular significance is attributed to these surface-active auxiliaries in the stabilization of overdried sand layers for example. Relevant specialist knowledge may be applied in determining the type and quantity of the paticular surface-active auxiliary used.

The soil-stabilizing aqueous active-substance preparations may be applied in known manner at the same time as plant seeds are being sown. However, the corresponding treatment of the soil may also be carried out independently of stabilization before or after application of the—in particular—aqueous impregnating compound according to the invention.

Field trials with the auxiliaries according to the invention have shown that not only can the required soil-stabilizing effect be achieved and maintained over a considerable period of at least several weeks without significantly affecting germination processes and the developing plant growth, another often desirable effect has also been observed, namely: water retention in soil stabilized in accordance with the invention is distinctly increased in relation to adjacent areas of untreated soil. It will readily be appreciated that this affords important advantages, particularly for the stabilization and grassing of soil in dry regions and/or under comparatively hot climatic conditions.

In another embodiment, the invention enhances this effect by another modification: the chemistry of natural materials, synthetic chemistry and/or semisynthetic chemistry have developed a number of polymer components which are distinguished by an extreme water absorption capacity and a high capacity to retain the water absorbed. These materials, which are known as "superslurpers", are widely used in various fields of application, particularly in the field of hygiene. Now, suitable preparations of these water-binding polymers may also be used in accordance with the present invention to treat the surface layers of soil and hence to promote plant growth while limiting the scale and/or frequency of irrigation of the soil planted with seeds, for example grass seeds. These water-binding semisynthetic or fully synthetic polymers may be introduced into the soil before it is treated with the impregnating compounds according to the invention although they may also be combined with at least part of the adhesive-like impregnating compound. Information on the chemical characteristics of these water-binding auxiliaries can be found in the relevant specialist literature on auxiliaries of the type in question. The use of growth-promoting auxiliaries is also possible and falls within the scope of the teaching according to the invention.

What is claimed is:

1. A process for stabilizing soil susceptible to erosion comprising the steps of:
   A) impregnating the soil with an aqueous composition comprising at least one biologically compatible wetting agent, and
   B) impregnating the wet soil from step A) in at least one treatment with one or more aqueous compositions comprising at least one binder which is an ester of polyvinyl alcohol with a $C_{2-5}$ monocarboxylic acid or a mixture of a $C_{2-5}$ monocarboxylic acid and a higher monocarboxylic acid.

2. The process of claim 1 wherein the step A) aqueous composition also includes part of the total quantity of the step B) binder used in the process.

3. The process of claim 2 wherein the binder in the step A) aqueous composition is less than 50% of the total quantity of binder used in the process.

4. The process of claim 3 wherein the binder in the step A) aqueous composition is less than 20% of the total quantity of binder used in the process.

5. The process of claim 1 wherein the aqueous composition in step A) consists essentially of water and at least one biologically compatible wetting agent.

6. The process of claim 1 wherein the aqueous composition in step A) contains less than 5% by weight of binder.

7. The process of claim 6 wherein from 0.3 to 2% by weight of binder is present in said aqueous composition.

8. The process of claim 1 wherein at least one aqueous composition in step B) contains at least one biodegradable plasticizer.

9. A process according to claim 8, wherein the plasticizer is selected from the group consisting of triesters of glycerol with lower aliphatic monocartoxylic acids, citric acid triesters with lower aliphatic monohydric alcohols, and epoxidized triglycerides of mono- or polyolefinically unsaturated fatty acids.

10. A process according to claim 1, wherein the wetting agent in step A) has an HLB value of at least 7.

11. A process according to claim 10, wherein the wetting agent has an HLB value of at least 8.

12. A process according to claim 11, wherein the wetting agent has an HLB value of 10 to 18.

13. A process according to claim 1, wherein the wetting agent in step A) is derived from a compound selected from the group consisting of esters, partial esters, polyethoxylates, oligoethoxylates, acetals, and alkyl (poly) glycosides.

14. A process according to claim 1, wherein the aqueous composition in step A) comprises up to 0.5% by weight wetting agent.

15. A process according to claim 14, wherein the aqueous composition in step A) comprises up to 0.5% by weight wetting agent.

16. A process according to claim 15, wherein the aqueous composition in step A) comprises 0.1% to 0.2% by weight wetting agent.

17. A process according to claim 1, wherein the at least one binder in step B) is based on a compound selected from the group consisting of polyvinyl acetate, polyvinyl propionate, copolymers of polyvinyl acetate and a vinyl ester of a $C_4$ or higher fatty acid, and copolymers of polyvinyl propionate and a vinyl ester of a $C_4$ or higher fatty acid.

18. A process according to claim 17, wherein the vinyl ester of a higher fatty acid is vinyl laurate.

19. A process according to claim 1, wherein the at least one binder in step B) comprises polyvinyl acetate stabilized in an aqueous dispersion with a biodegradable emulsifier.

20. A process according to claim 19, wherein the emulsifier is selected from the group consisting of polyvinyl alcohol, starch, water-soluble starch derivatives, and mixtures thereof.

21. The process of claim 1 wherein the aqueous composition in step B) also contains a stabilizer.

22. A process according to claim 21, wherein the stabilizer comprises a biodegradable compound selected from the group consisting of fatty acids and fatty alcohols that are solid at room temperature or that are air-curable and water-insoluble esters, ethers, or salts thereof.

23. A process according to claim 22, wherein the stabilizer comprises a mono- or polyolefinically unsaturated fatty acid or alcohol optionally substituted with an ether or ester group.

24. A process according to claim 22, wherein the stabilizer further comprises a salt of a mono- or polyolefinically unsaturated fatty acid with a polyvalent cation selected from Group II or Group III of the periodic table of elements.

25. A process according to claim 24, wherein the salt is a salt of calcium or aluminum.

26. A process according to claim 22, wherein the stabilizer is applied to the soil after step A).

27. A process according to claim 22, wherein the stabilizer is provided with a biodegradable organic flow aid.

28. A process according to claim 27, wherein the organic flow aid is derived from an alcohol, an ether, or a carboxylic acid ester.

29. A process according to claim 22, wherein the weight ratio of binder used to stabilizer used is 5:1 to 1:5.

30. A process according to claim 29 wherein the weight ratio of binder used to stabilizer used is 2:1 to 1:3.

31. A process according to claim 22, wherein the stabilizer is mixed with a film forming agent having a minimum film forming temperature of 0° C. to 15° C.

32. A process according to claim 22, wherein the binder and stabilizer are each applied in a quantity of at least 50 grams per square meter of the soil.

33. A process according to claim 32, wherein the quantity applied is at least 100 grams each of binder and stabilizer per square meter of soil.

34. A process according to claim 33, wherein 150 to 250 grams each of binder and stabilizer are applied per square meter of soil.

35. A process according to claim 22, further comprising applying plant seeds, fertilizers, or water retention aids to the soil with the stabilizer.

* * * * *